United States Patent [19]

Findlan

[11] Patent Number: 4,899,923
[45] Date of Patent: Feb. 13, 1990

[54] HIGH PRESSURE BONDING PROCESS

[75] Inventor: Shane J. Findlan, Concord, N.C.

[73] Assignee: Electric Power Research Institute, Inc., Palo Alto, Calif.

[21] Appl. No.: 307,228

[22] Filed: Feb. 6, 1989

Related U.S. Application Data

[63] Continuation of Ser. No. 144,537, Jan. 14, 1988, abandoned.

[51] Int. Cl.⁴ .................. B23K 20/00; B23K 20/22; B23K 20/24
[52] U.S. Cl. .................. 228/193; 228/127; 228/186; 228/203; 228/243; 228/103; 73/866
[58] Field of Search .............. 228/119, 127, 135, 171, 228/175, 193, 197, 203, 237, 243, 186, 103; 29/421 R; 73/866

[56] References Cited

U.S. PATENT DOCUMENTS

| | | | |
|---|---|---|---|
| 3,559,274 | 2/1971 | Granata | 228/243 |
| 3,893,226 | 7/1975 | Waite | 228/193 |
| 4,454,977 | 6/1984 | Aldinger et al. | 228/243 |
| 4,485,961 | 12/1984 | Ekbom et al. | 228/193 |
| 4,499,156 | 2/1985 | Smith et al. | 228/193 |
| 4,603,801 | 8/1986 | Wan et al. | 228/243 |
| 4,628,008 | 12/1986 | Conolly | 228/243 |
| 4,732,312 | 3/1988 | Kennedy et al. | 228/203 |
| 4,810,462 | 3/1989 | Hsu et al. | 164/80 |

FOREIGN PATENT DOCUMENTS

| | | | |
|---|---|---|---|
| 653976 | 12/1962 | Canada | 228/193 |
| 99054 | 8/1978 | Japan | 228/193 |
| 149149 | 12/1978 | Japan | 228/193 |
| 156879 | 9/1982 | Japan | 228/193 |
| 195590 | 12/1982 | Japan | 228/193 |
| 30292 | 2/1986 | Japan | 228/193 |
| 556012 | 6/1977 | U.S.S.R. | 228/243 |

OTHER PUBLICATIONS

"Diffusion Welding", Owczarski, W. A., SAE Transactions, pp. 537–548, 1965.
"A Review of Diffusion Welding", Gerken and Owczarski, Welding Research, pp. 1–27, Oct. 1965.

Primary Examiner—Richard K. Seidel
Assistant Examiner—Samuel M. Heinrich
Attorney, Agent, or Firm—James B. Hinson

[57] ABSTRACT

Fabrication of the test structure is functionally illustrated in FIG. 9. More specifically, the first step in the process is to machine the cavity 40 in the third body of austenitic material 42, as functionally illustrated at reference numeral 80. After the cavity 40 has been machined, the fault sample 34 is installed into the cavity by heating the third body of austenitic material 42 and cooling the fault sample 34. This process is functionally illustrated at reference numeral 82. After installation of the fault sample 34, the interface is welded to seal the junction and the combined structure HIP bonded, as functionally illustrated at Reference Numerals, 84 and 86. After bonding the test structure is machined into the desired configuration, as functionally illustrated at Reference Numeral 88.

4 Claims, 2 Drawing Sheets

HIGH PRESSURE BONDING PROCESS

This is a continuation of co-pending application Ser. No. 07/144,537 filed on Jan. 14, 1988, now abandoned.

BACKGROUND OF THE INVENTION

1. Field of the Invention

The invention relates to metal working processes and more particularly to improved HIP Bonding processes particularly suited for bonding austenitic materials.

2. Description of the Prior Art

Specialized Pressure Bonding techniques are widely available in the prior art. For example, U.S. Pat. No. 4,628,008 issued to Conolly discusses the assembly of "sticks" to form a defect-immunized major component such as a turbine disc or rotor. Prior art techniques are further illustrated by U.S. Pat. No. 4,603,801, issued to Wan which discloses an interference fit seal to prevent the pressure transmitting medium from entering the interfaces of the HIP bonding joint. The pressure transmitting medium is further described as a thick, high-viscosity material, such as molten glass, which is thick enough not to penetrate the interference fit seal. Other prior art techniques are illustrated by U.S. Pat. No. 4,485,961, issued to Ekbon, which illustrates a method for creating a weld using the HIP bonding technique. The joint is covered by a powder of similar composition to the material being joined, which is in turn covered by various glass-like compositions that act as a pressure transmitting medium. At elevated temperatures, the glass composition melts and provides a sealing boundary. The powder covering the joints is fused during the HIP Bonding process to complete the weld.

A method for sheathing tubular nuclear fuel elements is disclosed in U.S. Pat. No. 3,559,274, issued to Granata. Zircalloy sheathing tube is shrink fitted inside of a uranium pipe. After shrink fitting, the assembly is heated and the outside is cooled so as to form a diffusion bond at the interface. The fusion is due to the expansion of the sheath, contraction of the tube, and the heat at the interface.

SUMMARY OF THE INVENTION

The invention which is the subject matter of this patent application comprises an improved Pressure Bonding process. The invention was reduced to practice as a result of and is described with respect to its use to implant a fault of known characteristic in a larger body of austenitic material. However, it will be appreciated by those skilled in the art that the hereinafter described bonding process has many uses.

In demonstrating the invention, a fault having the desired characteristics was formed in a surface of a first body of austenitic material and implanted in a larger body of austenitic material by bonding the first body of austenitic material to a second similar body. The larger body of austenitic material was machined to form a cylindrical structure (fault sample) containing the fault with the fault positioned at a predetermined location therein. A cylindrical cavity having a diameter less than the diameter of the cylindrical structure was machined in a third body of austenitic material. The cylindrical structure and the third body were respectively cryogenically cooled and heated to insert the cylindrical structure into the cavity. After insertion of the cylindrical structure, the combined structure was stabilized to a uniform temperature causing an interference fit creating sufficient pressure at the interface formed by the interior of the cavity and the outer surface of the cylindrical structure to cause localized cold working of the interface surfaces.

A non-oxidizing atmosphere was established around the combined structure and the interface sealed. A bond free of detectable variations in grain structure was formed along the interface using a HIP bonding cycle without significantly altering the original grain structure of portions of the austenitic material which had not been subjected to cold working.

In demonstrating the invention conventional welding was used to seal the bonding interface. Additionally, it has also been demonstrated that an interference fit can be utilized to achieve high temperature bonding without isostatic pressure. Without the isostatic pressure during the bonding cycle, a detectable discontinuity may develop along the bond line. Such discontinuity may not be objectionable in some applications.

It is believed that the cold worked surfaces associated with the disclosed process results in a small grain structure along the interface to be bonded. These smaller grains recombine to form larger grains extending across the interface producing a bond. Grain regrowth during the bonding cycle restores the original grain structure and progresses to completion at a temperature sufficiently low to prevent grain alterations in the portions of the material not subjected to cold working. This permits HIP bonding to be accomplished at a lower temperature. A lower bonding temperature is an especially useful characteristic of the improved bonding process when utilized to bond austenitic metals.

DETAILED DESCRIPTION

It was necessary to carefully select the size and shape of bodies of austenitic material to be joined together by prior art HIP bonding processes. By contrast the process which is the subject of the invention described in this patent application can be used to join bodies of any desired size as long as a suitable interface between the two bodies is maintained. A suitable interface is maintained as long as the bodies to be bonded together are properly machined and assembled in accordance with the process which is the subject of the disclosed invention.

Figure 6:
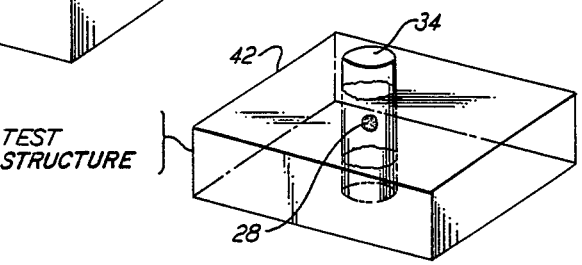
FIG. 6 is a drawing illustrating the test structure after final assembly.

FIGS. 1 through 4 illustrates the fault sample at various stages of assembly. In practicing the invention as applied to implanting a fault in a test structure (FIG. 6), the desired fault is implanted into a fault sample which is in turn implanted into a larger body to form a test structure.

Figure 4:
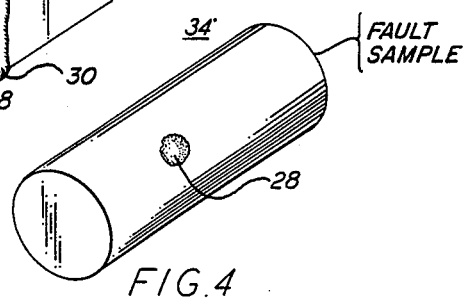
FIG. 4 is a drawing illustrating the fault sample after final machining.
Figure 5:
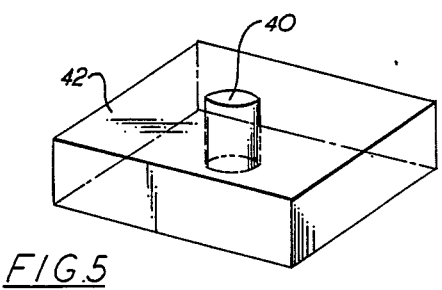
FIG. 5 is a drawing illustrating a third body of austenitic material including a cylindrical cavity machined therein.

Two substantially identical first and second bodies, 20 and 22, of austenitic material are utilized to form the fault sample 34 (FIG. 4). Two similar interfaces, 24 and 26, of the bodies of materials, 20 and 22, are severely cold-worked using any suitable machining technique. A fault 28 having the desired characteristics is formed in one surface, for example surface 26 of body 22, using any suitable prior art techniques. The first and second bodies of materials, 20 and 22, are positioned in contacting end-to-end relationship to each other and sealed around the periphery of the interface formed by the contacting surfaces by welding in a protective atmosphere. The seal weld is illustrated at reference numeral 30. A single unitary body 32 is formed by HIP bonding the bodies, 20 and 22, together. The body 32 is then machined to form a cylindrical fault sample 34 containing the fault 28 therein.

Alternatively, the fault 28 may be formed as complementary portions in the surfaces, 24 and 26, of the bodies, 20 and 22. While conventional HIP bonding processes have been successfully used to bond relatively small components, such as for forming the fault sample 34, they have not proved successful in bonding larger components. These difficulties with the prior art processes are believed to be caused by an inability of these processes to maintain a suitable interface between the components to be bonded as the size of the interfacing surfaces of the components increases.

In first demonstrating the invention disclosed herein, the fault sample 34 was implanted into a third larger body of identical material at a predetermined location. Specifically, the fault sample 34 was inserted into a cylindrical cavity 40 in a third body 42 of austenitic material. The diameter of the cavity 40 is smaller than the outer diameter of the fault sample 34 producing an interference fit.

Insertion of the fault sample 34 into the cavity 40 was facilitated by heating the third body 42 and cryogenically cooling the fault sample 34. After insertion of the fault sample 34 into the body of material 42 the resulting test structure was stabilized to a uniform temperature resulting in extreme pressure at the interface of the body of austenitic material 42 and the fault sample 34. This pressure causes cold-working of the interfacing surfaces. Seal welding in a protective atmosphere was utilized along the upper and lower surfaces of the third body of material 42 and the fault sample 34 to seal the interface. This results in the assembled test structure illustrated in FIG. 6. The assembled test structure was subjected to a HIP bonding cycle to form a unitary body free of abnormalities at the interface of the third body of austenitic material 42 and the fault sample 34 without causing undesirable metallurgical changes in the other portions of the structure. The bond forms as the grains comprising the cold-worked surfaces reform into larger grains extending across the interface. As previously discussed, this grain regrowth restores the original grain structure along the bond and progresses to completion without altering the grain structure of portions of the austenitic material which have not been subjected to cold working.

Figure 7:
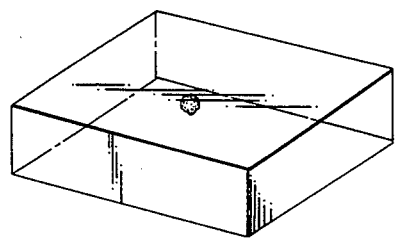
FIG. 7 is a drawing illustrating the test structure after bonding and final machining.

After bonding, the test component can be machined into any desired configuration. In the development program, it was machined into a rectangular body as illustrated in FIG. 7 which was subjected to various tests to demonstrate that the improved bonding process performed as desired.

Figure 8:
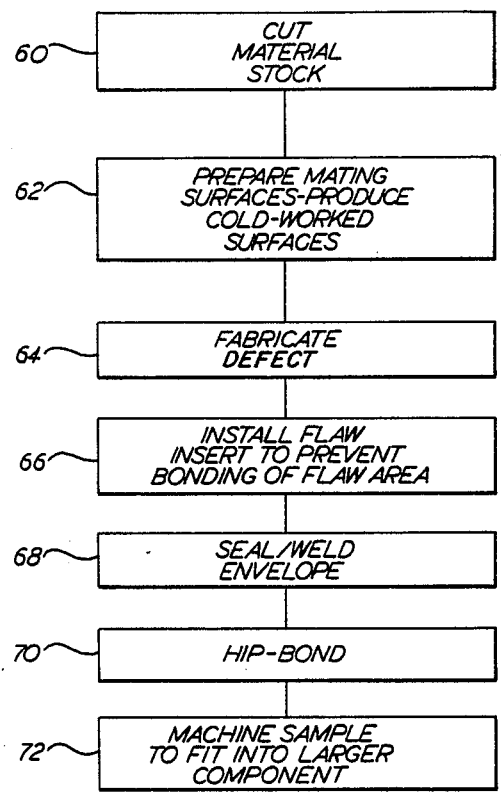
FIG. 8 is a flow chart illustrating a process for preparing the defect sample.

FIG. 8 is a flow chart of the process utilized to form the fault sample 34. The first step is to cut the austenitic material to form the two substantially identical bodies, 20 and 26, which are subsequently HIP bonded to form the fault sample 34 (FIG. 4). This step is functionally illustrated at reference numeral 60, FIG. 8.

Cold worked surfaces, 24 and 26, are produced by machining selected surfaces of the two rectangular bodies, 20 and 22. A fault 28 is fabricated using any desired process. These steps are functionally illustrated at reference numerals, 62 and 64.

Figure 1:
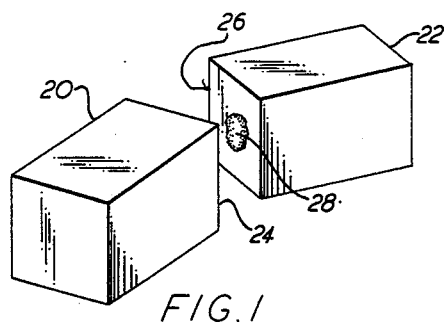
FIG. 1 is a drawing illustrating two bodies of austenitic material used to form the fault sample.
Figure 2:
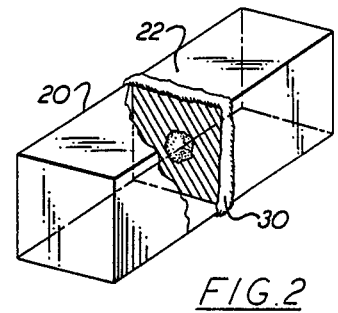
FIG. 2 is a drawing illustrating two bodies of austenitic material assembled for HIP bonding.
Figure 3:
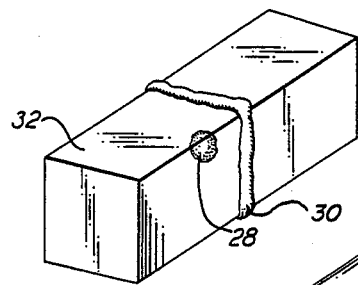
FIG. 3 is a drawing illustrating a fault implanted in a body of austenitic material.

The faul 28 is installed in at least one surface of the bodies, 20 and 22. Protection for the interface is provided by a seal weld as illustrated in FIG. 2. Process steps producing these results are illustrated at reference numerals, 66 and 68. The fault sample is HIP Bonded and machined into final form to produce the fault sample 34 as illustrated at reference numerals, 70 and 72.

Figure 9:
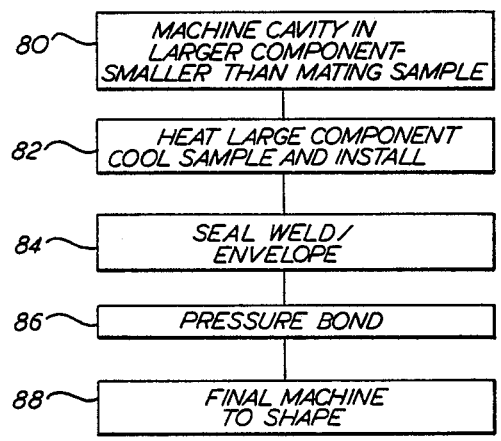
FIG. 9 is a flow chart for the Bonding Process comprising the invention.

Fabrication of the test structure is functionally illustrated in FIG. 9. More specifically, the first step in the process is to machine the cavity 40 in the third body of austenitic material 42, as functionally illustrated at reference numeral 80. After the cavity 40 has been machined, the fault sample 34 is installed into the cavity by heating the third body of austenitic material 42 and cooling the fault sample 34. This process is functionally illustrated at reference numeral 82. After installation of the fault sample 34, the interface is welded to seal the junction and the combined structure HIP bonded, as functionally illustrated at Reference Numerals, 84 and 86. After bonding the test structure is machined into the desired configuration, as functionally illustrated at Reference Numeral 88.

Process parameters such as pressure and temperature for performing the above described bonds are determined by the characteristics of the materials. Selection of these parameters is within the capability of those skilled in the art. Also, the process can be used to bond materials other than the austenitic materials described above.

I claim:

1. A method of forming a bond along a common junction between abutting surfaces of at least first and second bodies of austenitic stainless steel, said austenitic stainless steel having at least the characteristic that increasing the temperature of said bodies of austenitic stainless steel above a predetermined value causes the average grain size of said austenitic stainless steel to change thereby producing undesirable changes in the metallurgical properties of said austenitic stainless steel, comprising the steps of:

(a) controlling the temperature of at least one of said first and second bodies of austenitic stainless steel within a range having a maximum value selected to be below the temperature which causes undesirable changes in the metallurgical properties of said first and second bodies of austenitic stainless steel to produce a temperature differential therebetween, said temperature differential causing the relative dimensions of said first and second bodies of austenitic stainless steel to change;

(b) positioning said second body in a cavity in said first body;

(c) reducing said temperature differential and maintaining the temperature of said first and second bodies below the temperature which causes undesirable changes in the metallurgical properties of said first and second bodies of austenitic stainless steel to selectively change the relative dimensions of said first and second bodies of austenitic stainless steel thereby causing selected adjacent surfaces of said first and second bodies of austenitic stainless steel to contact to form said common junction and produce sufficient force across said common junction to cause cold working of the contacting surfaces forming said common junction thereby reducing the average grain size of said first and second bodies in regions adjacent said common junction;

(d) applying pressure to selected exterior surfaces of said first and second bodies of austenitic stainless steel, said force being directed to increase the force across said common junction; and (e) increasing the temperature of said first and second bodies of austenitic stainless steel to a selected value thereby causing the grain structure of said cold worked portions of said first and second bodies of austenitic stainless steel to recrystallize to produce a substantially uniform grain structure and substantially uniform metallurgical properties throughout said first and second bodies of austenitic material and also producing a bond along said common junction, said bond and all other portions of said first and second bodies of austenitic material having metallurgical properties equivalent to the metallurgical properties of said first and second bodies of austenitic material prior to the formation of said bond.

2. A method of forming a bond in accordance with claim 1 wherein said cavity and second second body are cylindrical.

3. A method of forming a bond in accordance with claim 2 wherein said second body is cryogenically cooled to produce said temperature differential.

4. A method of forming a bond in accordance with claim 3 wherein the temperature of said first body is selectively increased to produce said temperature differential.

* * * * *